United States Patent Office 3,511,667
Patented May 12, 1970

3,511,667
COLOR COMPOSITION
Arthur T. Schramm, Chicago, and Jerome L. Mostek, Niles Ill., assignors to Stange Co., a corporation of Delaware
No Drawing. Filed Aug. 4, 1965, Ser. No. 477,291
Int. Cl. A23l 1/27
U.S. Cl. 99—78                                    13 Claims

ABSTRACT OF THE DISCLOSURE

A particulate food product comprising a solid carrier, containing a water soluble acid ingredient, and a water insoluble lake of a dye which is water soluble in its acid form plated on the carrier. The food product is dissolved in water to provide a beverage or dessert.

---

This invention relates to the use of insoluble lakes as the coloring matter for water soluble coloring compositions or dyes. More particularly, in a preferred form, this invention relates to the use of insoluble lakes as colors for food products and especially relates to concentrates of such lakes, water soluble powdered food products containing the lakes, aqueous solutions of the food products, and a method for preparing each of the same.

In recent years, soluble food products have become more and more popular with the consumer. Such soluble food products include, for example, the water soluble dry powdered gelatin desserts and the water soluble dry powdered fruit drink concentrates available today on the market, which are used by dissolving in water to prepare the corresponding food product. In such products, for consumer acceptability, it is highly desirable to color the dry powder to a proper and pleasing shade or intensity correlated with the shade or intensity of the finished or dissolved food product.

A proper color in the end prepared product, i.e. the gelatin dessert or fruit drink, can be obtained by adding soluble color matter to the powdered dry mix in a proper amount to give the proper color upon dissolution in a prescribed amount of water. However, the proper amount of color for properly coloring the dissolved product usually does not impart the same or closely similar color to the dry mix.

The usual water soluble colors have been added to such dry mixes in powdered form but their plating qualities are generally poor and the dry mix is, at best, faintly colored. Such soluble colors have also been micro-ground and, although the plating properties are thereby improved, dust problems are created. Plating grade colors have been developed which are generally satisfactory for imparting the correct color to the dry product while still retaining good color in the finished product. However, the plating grade colors are difficult to produce with any degree of consistency; and two identical products, when displayed side-by-side to the consumer on the grocer's shelf, may show marked degrees of shade or color variation.

Other techniques have been tried for providing proper color to both the dried powder and the dissolved final product. For example, sugar has been mixed with a soluble color and moistened, then dried and ground. Solutions of soluble color have been used by spraying on sugar or dextrose, followed by drying and grinding. Chromastarch colors have been tried, and colors carried by cellulosic carries have been tried. However, in each instance, it has been difficult, if not impossible, to provide a desired or proper color in both the dry mix and the dissolved product while still retaining consistency between batches.

As additional problems, many dry-mix food products contain soluble color blends instead of a single primary color. Often the dry mix will pick up moisture in the package during storage, shipment or the like, and the individual colors will dissolve and produce a specky or splotchy effect. Thus, green, compounded from blue and yellow, may become specks of blue in yellow or yellow in blue. This transitory behavior of the colors is known as "flashing." The flashing problem has been overcome by the use of spray-dried or drum-dried color blends, but the spray-dried or drum-dried product has no appreciable plating characteristic and the dry food product mix is usually almost colorless.

It is a general object of this invention to provide a new and useful water soluble color system which is capable of imparting proper color in both dry and wet or dissolved forms.

Another object of this invention is to provide a new and useful free-flowing, water soluble color concentrate, colored food product, or the like, with proper color in both its dry form and its water solution form.

Still another object of this invention is to provide an improvement in the preparation of dry, water soluble color concentrates, colored food product concentrates, or the like, which utilizes the good plating characteristics of water insoluble lakes.

Another object of this invention is to provide such color concentrates, colored food products, or the like, in which an insoluble lake is plated on a water soluble divided particle carrier, which may be a component of a food product, in such manner that the lake is rendered water soluble.

Yet another object of this invention is to provide a storage stable, dry product according to any of the foregoing objects in which color flashing is virtually eliminated.

Still another object of this invention is to provide a new and useful method for producing a colored material according to any of the foregoing objects.

A more particular object is to provide such a method in which insoluble lakes are used for coloring particulate materials in a new and useful manner, which method can be easily and quickly carried out.

Other objects of this invention will be apparent from the following description.

According to this invention, insoluble lakes are plated on finely divided particles of an ingestible, water soluble carrier. Preferably, the carrier contains a water soluble acid. Usually, in the preferred form, a sufficient amount of water soluble acid is present in the carrier to acidify a water solution of the coloring material to an extent rendering the lake soluble. It is also preferred that the total amount of carrier material be sufficient to disperse the lake to an extent further enhancing its solubility, e.g. in the color system of this invention the color component often dissolves much faster in cold water when sugar, for example, is used in the carrier to help disperse the lake.

The color compositions of this invention may be easily prepared by merely mixing a dry, water insoluble lake with a dry, water soluble carrier. The water insoluble lake has excellent plating characteristics and plates out on the carrier, presenting all of the color on the carrier surface. Upon dissolving the composition during use, the acid component of the carrier dissolves in the water and lowers the pH of the water to a level solubilizing the insoluble lake.

Usually, a properly colored desirable powdered product is provided which, when dissolved in water, also has a proper desirable wet or solution color. It has been found that the plating ability of the insoluble lakes are such as to give excellent color intensity to the powdered product where only sufficient color material is used to provide the desired color intensity to the dissolved product.

The soluble carrier, which is plated by the insoluble lake, as indicated, preferably contains sufficient acid to render the lake soluble upon addition to water. The carrier will also usually include other water soluble materials such as sugars or sweetening agents in divided solid particulate form, e.g. crystals, granules, powders, or the like. The sugars or sweetening agents are included as needed or desired for the particular taste or sweetness of the product, and their presence or amount is not critical. For most products the total carrier component will include from 10 to 99.5 parts by weight total sugar and sweetening agent and from .5 to 90 parts by weight soluble solid acid, in each 100 parts by weight total carrier.

The sweetening agents include such agents as saccharin, granulated cane sugar, and the like. Other sugars can be used in the compositions as fillers and/or sweetening agents, including dextrose, syrup solids, sucrose, fructose, galactose, maltose, lactose, etc. Such sugars and other sweetening agents are used herein the same amounts and proportions as those normally used in non-sweetened, presweetened, dietetic, and like food products.

Any of the ingestible water soluble acids can be used as the acid component as the water soluble carrier. Such acids include those edible acids naturally occurring in food products as well as those which are often added as acid ingredients in the preparation of food products. Among the more common acids are citric, fumaric, adipic, tartaric and malic. Also used are acetic, hydrochloric, ascorbic, and other organic and inorganic acids. Preferably, the acid is normally solid and functions as a carrier for the insoluble lake.

Insoluble lakes are well known in the art and any such lakes can be used. Lakes are straight colors extended on a substrate by adsorption, co-precipitation and/or chemical combination. A straight color is a coal tar color or other color additive. The insoluble lakes include those lakes made by extending a salt prepared from one of the certified water soluble straight colors on a substratum of alumina, calcium, or the like. The insoluble lakes are commercially available, and methods for their production are well known. For example, Pratt, "The Chemistry and Physics of Organic Pigments," describes the preparation of lakes, and Blumenthal, "American Dyestuff Reporter," vol. 35, No. 23, p. 529, "A Review of the Literature on Color Lakes," exemplifies preparations of insoluble lakes on aluminum, aluminum-barium, barium or calcium substrates. The lakes usually have a dye content between about 15 and 40%. In one common method for preparing insoluble lakes. e.g. aluminum lakes, an alumina hydrate is formed in water and is precipitated in the presence of the dye or color material and a gel is formed by the alumina hydrate with the dye, the dye being adsorbed by and/or reacted with the gel.

The useful straight colors include the approved FD&C colors, such as FD&C Red No. 2, i.e. the trisodium salt of 1-(4'-sulfo - 1' - naphthylazo)-2-hydroxy-naphthalene-3:6-disulfonic acid; FD&C Red No. 3, i.e. the disodium or dipotassium salt of tetra-iodofluorescein, or of hydroxytetra-iodo-o-carboxy-phenylfluorone; FD&C Yellow No. 5, i.e. the trisodium salt of 4-(4'-sulfo-1'-phenylazo)-[1(4'-sulfophenyl)-5-hydroxypyrazol-3-carboxylic acid]; FD&C Yellow No. 6, i.e. the disodium salt of 1-(4'-sulpho-1'-phenylazo)-2-hydroxy-naphthalene - 6 - sulphonic acid; FD&C Blue No. 1, i.e. the disodium salt of symmetrical diethyl-di-m-sulfobenzyl-di-p-amino-o' - sulfofuchosonimonium; FD&C Blue No. 2, i.e. the disodium salt of indigotin-5:5'-disulfonic acid; FD&C Green No. 3, i.e. the disodium salt of diethyl-di-sulfobenzyl-p-amino-oxysulfofuchsonimonium; and FD&C Violet No. 1, i.e. the sodium salt of dimethyl-diethyl-disulfobenzyl-p,p'-diamino-fuchsonimonium.

All of the foregoing are synthetic coal tar dyes. They are useful as primary colors and as mixtures. Insoluble lakes of other dyes may also be prepared for use herein. Other color materials may be mixed with the insoluble lakes for use herein as desired or needed, including water soluble dyes and such color materials as beet juice, beet powder, calcium carbonate, carbon black, carmine, carminic acid, carrot oil, cochineal, grape skin extract, paprika and paprika oleoresin, riboflavin, saffron, turmeric and curcumin, xanthophyll, and the like, each of which is listed for food use on the basis of prior commercial sale rather than on the basis of FD&C certification.

All of the FD&C colors are water soluble in their acid form, and all of the acid forms of those FD&C colors identified above dissolve at a low pH with the exception of Red No. 3. Red No. 3 is soluble at a higher pH so that less acid may be required in the present compositions embodying Red No. 3 than in similar compositions embodying other colors. The ratio of acid to color can be adjusted to provide proper solubility of the insoluble lake. It has been found that most of the lakes are soluble at a pH of about 6 or below, and the pH of a food product containing an acid component will usually be below 3.

It is also intended that the insoluble lakes can be blended to provide such shades as cherry, lime, orange, lemon-lime, and other shades of colors. Such blending, in itself, is not a part of this invention but can be carried out within the skill of the art to obtain a desired color for a given product, i.e. the blend is intended to be used in products of this invention. It is one advantage of this invention that the blended colors do not separate out or flash during storage.

Insoluble lakes have excellent plating characteristics, as noted. Where it is not otherwise possible to obtain the proper color for both the liquid and solid products, advantage can be taken of the superior plating characteristics of insoluble lakes compared with soluble dyes by mixing the insoluble lakes with soluble dyes or other color materials for plating. In the solid products, the insoluble lake will predominate due to its much better plating abilities, but the color of the soluble dye will appear when the dry product is added to water to prepare the finished food product. For example, a dry powdered food product can be plated with insoluble lakes according hereto to obtain the desired dry color. The product is then dissolved in water and, if the color is not quite the color desired, soluble dyes can be mixed with the dissolved product to adjust the color. Knowing the amount of insoluble lakes originally added and the amount of soluble dyes used for adjustment, the insoluble lakes and soluble dyes can be mixed in a determined ratio and used as a mixture during plating of future similar products. In the dry product, the desired insoluble lake color will predominate while, in the dissolved final food product, all colors will dissolve.

Although the ratios of carrier to lake have been discussed above and it has been noted that it is preferred to provide sufficient carrier to disperse the lake, more advantageously the lake is used in amounts of from about 0.0001 to about 10% by weight and preferably in amounts from about 0.001 to about 2% by weight based on total carrier. In the carrier, it is preferred to use 25–99 parts by weight combined sugar and sweetening agent and 1–75 parts by weight normally solid water soluble acid.

Other ingredients may also be added to the compositions of this invention for preparing dry mix food products. A flavor component, usually in the amount of about .001 to 10% by weight, can be used as prescribed by the customer for whom the food product is being formulated. This flavor component can be included to the customer's own particular taste, and the amount may vary widely depending on the flavor strength of the flavor component used, the nature of the flavor, the nature of the product, and the like. Other materials which may be added include gelatin powders which are usually used in amounts of from 10–20 parts by weight based on total composition for preparing gelatin desserts. Clouding agents may be used as desired in dry mix drinks such as citric fruit drinks. Other ingredients include antioxidants, anti-caking agents, buffering agents, gums, vitamins, preservatives, and other usual additives for food compositions.

The following examples are offered by way of illustration of specific dry mix food products which can be prepared following this invention, and these examples are not intended as limitations on this invention.

EXAMPLE 1

Powdered orange drink base, non-sweetened

| Ingredient: | Parts by wt. |
| --- | --- |
| Dextrose | 83.3 |
| Citric acid | 15.7 |
| Orange flavors | .7 |
| Aluminum Lake of FD&C Yellow No. 5 | .1 |
| Aluminum Lake of FD&C Yellow No. 6 | .1 |
| Miscellaneous ingredients and food additives [1] | Usual amounts |

[1] Includes gums, preservatives, buffering agents and vitamins.

Final use: dissolve ½ ounce per quart of water and add sugar to taste for orange drink.

EXAMPLE 2

Powdered orange drink bases, pre-sweetened (non-dietetic)

| Ingredient: | Parts by wt. |
| --- | --- |
| Granulated sugar | 92 |
| Dextrose | 7 |
| Citric acid | 1.2 |
| Orange flavors | 0.06 |
| Aluminum Lake of FD&C Yellow No. 5 | .01 |
| Aluminum Lake of FD&C Yellow No. 6 | .01 |
| Miscellaneous ingredients and food additives [1] | Usual amounts |

[1] Includes gums, preservatives, buffering agents and vitamins.

Final use: dissolve 3 ounces per 1 quart of water to form orange drink.

EXAMPLE 3

Powdered lemon-lime drink base, non-sweetened

| Ingredient: | Parts by wt. |
| --- | --- |
| Dextrose | 83.4 |
| Citric acid | 15.7 |
| Lemon-lime flavors | .7 |
| Aluminum Lake of FD&C Yellow No. 5 | .095 |
| Aluminum Lake of FD&C Blue No. 1 | .005 |
| Miscellaneous ingredients and food additives [1] | Usual amounts |

[1] Includes gums, preservatives, buffering agents and vitamins.

Final use: dissolve ½ ounce per quart of water and add sugar to taste for lemon-lime drink.

EXAMPLE 4

Powdered lime drink bases, pre-sweetened (non-dietetic)

| Ingredient: | Parts by wt. |
| --- | --- |
| Granulated sugar | 92 |
| Dextrose | 7 |
| Citric acid | 1.2 |
| Lime flavors | .04 |
| Aluminum Lake of FD&C Yellow No. 5 | .02 |
| Aluminum Lake of FD&C Blue No. 1 | .002 |
| Miscellaneous ingredients and food additives [1] | Usual amounts |

[1] Includes gums, preservatives, buffering agents and vitamins.

Final use: dissolve 3 ounces per 1 quart of water to form lime drink.

EXAMPLE 5

Powdered grape drink base, non-sweetened

| Ingredient: | Parts by wt. |
| --- | --- |
| Dextrose | 83.5 |
| Citric Acid | 14.0 |
| Grape Flavors | .6 |
| Aluminum Lake of FD&C Red No. 2 | .3 |
| Aluminum Lake of FD&C Blue No. 1 | .075 |
| Miscellaneous ingredients and food additives [1] | Usual amounts |

[1] Includes gums, preservatives, buffering agents and vitamins.

Final use: dissolve ½ ounce per quart of water and add sugar to taste for grape drink.

EXAMPLE 6

Powdered grape drink bases, pre-sweetened (non-dietetic)

| Ingredient: | Parts by wt. |
| --- | --- |
| Granulated sugar | 92 |
| Dextrose | 7 |
| Citric acid | 1.2 |
| Grape flavors | .1 |
| Aluminum Lake of FD&C Red No. 2 | .18 |
| Aluminum Lake of FD&C Blue No. 1 | .02 |
| Miscellaneous ingredients and food additives [1] | Usual amounts |

[1] Includes gums, preservatives, buffering agents and vitamins.

Final use: dissolve 3 ounces per 1 quart of water to form grape drink.

EXAMPLE 7

Orange gelatin dessert powder (for package sales)

| Ingredient: | Parts by wt. |
| --- | --- |
| Gelatin powder | 12 |
| Granulated sugar | 71 |
| Dextrose | 13 |
| Citric acid | 2 |
| Orange flavors | .3 |
| Aluminum Lake of FD&C Yellow No. 6 | .04 |
| Miscellaneous ingredients [1] | Usual amounts |

[1] Includes antioxidants, anticaking agents, buffering agents and Vitamin C.

Final use: dissolve 3 ounces per 1 pint of hot water and gel in usual manner.

EXAMPLE 8

Lime gelatin dessert powder (for package sales)

| Ingredient: | Parts by wt. |
|---|---|
| Gelatin powder | 12 |
| Granulated sugar | 71 |
| Dextrose | 13 |
| Citric acid | 2 |
| Lime flavors | .2 |
| Aluminum Lake of FD&C Yellow No. 5 | .018 |
| Aluminum Lake of FD&C Blue No. 1 | .002 |
| Miscellaneous ingredients [1] | Usual amounts |

[1] Includes antioxidants, anticaking agents, buffering agents and Vitamin C.

Final use: dissolve 3 ounces per 1 pint of hot water and gel in usual manner.

EXAMPLE 9

Cherry gelatin dessert powder (for package sales)

| Ingredient: | Parts by wt. |
|---|---|
| Gelatin powder | 12 |
| Granulated sugar | 71 |
| Dextrose | 13 |
| Citric acid | 2 |
| Cherry flavors | .25 |
| Aluminum Lake of FD&C Red No. 2 | .15 |
| Miscellaneous ingredients [1] | Usual amounts |

[1] Includes antioxidants, anticaking agents, buffering agents and Vitamin C.

Final use: dissolve 3 ounces per 1 pint of hot water and gel in usual manner.

EXAMPLE 10

Cherry gelatin dessert powder (for bulk sales)

| Ingredient: | Parts by wt. |
|---|---|
| Granulated sugar | 84 |
| Gelatin powder | 12 |
| Citric acid | 2 |
| Cherry flavors | ([1]) |
| Aluminum Lake of FD&C Red No. 2 | .2 |
| Miscellaneous ingredients [2] | Usual amounts |

[1] Customer's specification (e.g. about 0.2 parts by weight).
[2] Includes antioxidants, anticaking agents, buffering agents and Vitamin C.

Add 5 pints of boiling water to 17 ounces of mixture. Stir until dissolved and permit gelation in usual manner to form cherry gelatin dessert.

In addition to prepared dry mix food products, concentrates of color compositions can be prepared according to this invention. Such concentrates may be used not only in food products as exemplified above but can also be used for other coloring purposes where water soluble dyes are normally employed. As a concentrate, the insoluble lake can be plated on a soluble carrier in any desired concentration within the ability of the carrier to carry the lake. The concentrates are storage stable and can be later dissolved in water for use. Similarly, concentrates comprising a mixture of an insoluble lake with one or more other insoluble lakes or with one or more soluble dyes or other color material can be prepared, as can insoluble lakes mixed with other suitable diluents.

As specific examples of such color concentrates, a grape colored concentrate for low calorie pre-sweetened grape drinks can be prepared by plating 35 parts by weight of the aluminum lake of FD&C Red No. 2 and 5 parts by weight of the aluminum lake of FD&C Blue No. 1 on 7500 or less parts by weight dextrose. As another example, a cherry colored concentrate for low calorie cherry drinks can be prepared by mixing 5 parts by weight of the aluminum lake of FD&C Red No. 2 with 9 parts by weight of saccharin. As another form of concentrate, where it is desired to have a powder of one color which will dissolve in water to produce a slightly different color, a lime drink base color concentrate can be prepared by mixing 1 part by weight of FD&C Blue No. 1—Aluminum Lake with 9 parts by weight of FD&C Yellow No. 5. The resulting mixture can be plated on 6000 or less parts of citric acid or 250 or less parts of saccharin or can be sold in a color and flavor mix, e.g. mixed with 200 parts of lime flavor.

In the preferred compositions, the color is plated on a solid particulate carrier containing particles of normally solid organic acid; and it is to be understood that, although the above specific examples contained citric acid, other acids including malic, fumaric, adipic and tartaric and like acids are also advantageous for use in such compositions. The latter, being dicarboxylic acids, are usually used in up to about one and one-half times the amount of citric acid. As a concentrate, the proper insoluble lakes for the desired color are plated on any one or mixture of these acids, preferably using the amount of color and amount of acid desired in the ultimate powdered mixture.

Further, normally liquid acids can be used, in which case the acid is absorbed on sugar, saccharin, or other soluble carrier, prior to plating with the insoluble lake.

In working with the compositions of this invention, it appears that insoluble aluminum or other metal hydroxides of the insoluble lake substrates may be converted to a soluble aluminum salt of the water soluble acid included in the carrier. The straight color of the lake is converted to its acid form, which is water soluble. The conversion of the aluminum hydroxide to a soluble salt helps in eliminating flocking of aluminum hydroxide which may also be suppressed by dispersion of the insoluble lake on a large volume of filler material within the carrier, e.g. sugar.

It is an advantage of this invention that the colors available in the insoluble lakes are now made available for use in water soluble products, permitting more varied color combinations. The certied FD&C soluble colors do not, at present, cover the full desired range of colors; and the insoluble lakes, used in accordance with this invention, can fill a definite gap, particularly in the range of red colors.

As an additional advantage, the lakes, being insoluble, are stable on storage in the presence of moisture. Because of the excellent color and color stability of the dry product, it is preferred that the product be packaged in a transparent container such as a plastic or glass bottle or plastic-walled package so that the product can be viewed by the prospective purchaser. The excellent color of the dry product can be made to correspond closely to the color of the ultimate dissolved product for the benefit of the purchaser.

All percents given herein are percents by weight unless otherwise indicated.

The foregoing detailed description is given for clearness of understanding only and no unnecessary limitations are to be understood therefrom, as some modifications will be obvious to those skilled in the art.

We claim:

1. A solid water soluble dye which is color stable on storage, which dye comprises a particulate solid carrier and a water insoluble lake plated on said carrier, said carrier comprising a water soluble organic acid, said insoluble lake consisting essentially of said dye coabsorbed, coprecipitated or coreacted with an insoluble lake substrate.

2. A colored, particulate, free-flowing, solid, food product component concentrate which can be dissolved in water to form a colored food product component, which comprises a dry mix of an insoluble lake of a dye which is water soluble in its acid form, and a carrier for said lake comprising a water soluble, solid, particulate organic acid, said insoluble lake consisting essentially of said dye coabsorbed, coprecipitated or coreacted with an insoluble lake substrate.

3. A colored, particulate, free-flowing, solid, food product component concentrate which can be dissolved in water to form a colored food product component, which comprises a dry mix of an insoluble lake of a dye which is water soluble in its acid form, a small amount of a flavor component, and a carrier for said lake comprising a water soluble, solid, particulate sweetening agent and a water soluble, solid, particulate organic acid, said insoluble lake consisting essentially of said dye coabsorbed, coprecipitated or coreacted with an insoluble lake substrate.

4. A food product concentrate which comprises a mixture of solid, divided particles of a water soluble sweetening agent in an amount giving the desired sweetness to said concentrate, divided particles of a water soluble organic acid selected from the group consisting of citric acid, adipic acid, fumaric acid, tartaric acid, and malic acid, in an amount giving the desired acidic flavor to said concentrate, an amount of water soluble food flavor principal for flavoring said mixture to taste and a water insoluble lake selected from the group consisting of the aluminum and calcium lakes of FD&C Red No. 2, Red No. 3, Yellow No. 5, Yellow No. 6, Blue No. 1, Blue No. 2, Green No. 3, Violet No. 1 and mixtures thereof in an amount plating said divided particles to the desired dry color intensity, said insoluble lake consisting essentially of said dye coabsorbed, coprecipitated or coreacted with an insoluble lake substrate.

5. A food product concentrate which comprises a mixture of from about 10 to about 99.5 parts by weight solid, divided particles of a water soluble, edible sweetening agent from about .5 to about 90 parts by weight divided particles of a water soluble, edible organic acid selected from the group consisting of citric acid, adipic acid, fumaric acid, tartaric acid, and malic acid, and a water insoluble lake selected from the group consisting of the aluminum and calcium lakes of FD&C Red No. 2, Red No. 3, Yellow No. 5, Yellow No. 6, Blue No. 1, Blue No. 2, Green No. 3, Violet No. 1 and mixtures thereof in an amount of from about .0001 to 10 percent by weight, based on total weight of said divided particles, plating said divided particles to the desired dry color intensity, said insoluble lake consisting essentially of said dye coabsorbed, coprecipitated or coreacted with an insoluble lake substrate.

6. A method of making a water soluble colored food product, which method comprises plating divided particles of a water soluble, solid, ingestible carrier containing a water soluble acidic component with a water insoluble lake of a dye which is soluble in its acid form to provide a uniformly colored mixture of divided, solid particles, said insoluble lake consisting essentially of said dye coabsorbed, coprecipitated or coreacted with an insoluble lake substrate.

7. The method of claim 6 wherein said carrier comprises a normally solid, water soluble, organic acid.

8. In a process of preparing a water soluble dry food product concentrate containing a material amount of sugar and a water soluble dry acid ingredient and intended to be dissolved in water to form a liquid food product, the improvement which comprises mixing a dry water insoluble color lake with the dry food product concentrate in a proper amount for providing the proper dry color intensity and shade to the concentrate in its dry state and the proper wet color intensity and shade to the liquid food product resulting from dissolving said concentrate in water, said insoluble lake consisting essentially of said dye coabsorbed, coprecipitated or coreacted with an insoluble lake substrate.

9. The process of claim 8 wherein the proper dry color intensity and shade approximates the proper wet color intensity and shade.

10. The method of preparing a properly colored, water soluble food concentrate for dissolving in water to form a food product, which method comprises mixing a solid, particulate, water soluble sweetening agent with a solid, particulate, water soluble organic acid, adding an amount of water soluble flavor principal to provide the desired taste, and plating the sweetening agent and organic acid particles with an FD&C certified water insoluble lake of the desired color for said concentrate, said insoluble lake consisting essentially of said dye coabsorbed, coprecipitated or coreacted with an insoluble lake substrate.

11. The method of preparing a packaged, properly colored, water soluble food concentrate for dissolving in water to form a food product, which method comprises mixing from about 10 to about 99.5 weight percent of a water soluble sweetening agent, with from about 0.5 to about 90 weight percent of an organic acid selected from the class consisting of citric acid, adipic acid, fumaric acid, tartaric acid and malic acid, an amount of water soluble fruit flavor principal to provide the desired taster, and from about .0001 to about 10 weight percent of a water insoluble lake color selected from the group consisting of the aluminum and calcium lakes of FD&C Red No. 2, Red No. 3, Yellow No. 5, Yellow No. 6, Blue No. 1, Blue No. 2, Green No. 3, Violet No. 1, and mixtures thereof, and enclosing the resulting colored mixture in a transparent container, said insoluble lake consisting essentially of said dye coabsorbed, coprecipitated or coreacted with an insoluble lake substrate.

12. A method of making a water base colored product, which method comprises mixing divided particles of a water soluble, solid sweetening agent and a water soluble, solid organic acid, adding flavor to said mixture, plating the particles of said mixture with a water insoluble lake of a dye which is water soluble in its acid form to provide a uniformly colored mixture of divided, solid particles, and adding the resulting mixture to a quantity of water sufficient to dissolve the mixture in a desired concentration as a food product, said acid being present in an amount sufficient to solubilize said insoluble lake in said solution to provide a uniformly colored solution, said insoluble lake consisting essentially of said dye coabsorbed, coprecipitated or coreacted with an insoluble lake substrate.

13. A method of making a water base colored food product which method comprises preparing a carried dye in which the carrier comprises a dry particulate, water soluble, solid, ingestible material and including water soluble organic acid, by plating particles of said carrier with a water insoluble lake of a dye to provide a uniformly colored particulate carrier with the lake plated on the surfaces of particles of said carrier as a particulate or powdered food product without chemical reaction between lake and carrier, and dissolving said food product in a quantity of water sufficient to provide the desired concentration of the food product in the water, said insoluble lake consisting essentially of said dye coabsorbed, coprecipitated or coreacted with an insoluble lake substrate.

References Cited

UNITED STATES PATENTS 3,111,411  11/1963  Livingston _____ 99—148

A. LOUIS MONACELL, Primary Examiner

S. B. DAVIS, Assistant Examiner

U.S. Cl. X.R.

8—79; 99—130, 141, 148